United States Patent
Gregorio (10) Patent No.: US 10,655,683 B2
(45) Date of Patent: May 19, 2020

(54) APPARATUS FOR TIGHTENING THREADED FASTENERS

(71) Applicant: HYTORC Division UNEX Corporation, Mahwah, NJ (US)

(72) Inventor: Christopher Gregorio, Cold Spring, NY (US)

(73) Assignee: HYTORC Division UNEX Corporation, Mahwah, NJ (US)

( * ) Notice: Subject to any disclaimer, the term of this patent is extended or adjusted under 35 U.S.C. 154(b) by 518 days.

(21) Appl. No.: 14/910,610

(22) PCT Filed: Aug. 6, 2014

(86) PCT No.: PCT/US2014/050002
§ 371 (c)(1),
(2) Date: Feb. 5, 2016

(87) PCT Pub. No.: WO2015/021197
PCT Pub. Date: Feb. 12, 2015

(65) Prior Publication Data
US 2016/0178013 A1  Jun. 23, 2016

Related U.S. Application Data

(60) Provisional application No. 61/862,530, filed on Aug. 6, 2013.

(51) Int. Cl.
*F16D 1/08* (2006.01)
*B25B 23/00* (2006.01)
(Continued)

(52) U.S. Cl.
CPC ............ *F16D 1/0805* (2013.01); *B25B 21/00* (2013.01); *B25B 21/005* (2013.01); *B25B 23/00* (2013.01);
(Continued)

(58) Field of Classification Search
CPC . F16D 1/0805; F16D 1/10; F16D 1/08; F16D 2001/103; F16D 1/06; B25B 21/00;
(Continued)

(56) References Cited

U.S. PATENT DOCUMENTS

| 1,775,402 A | * | 9/1930 | Mandl | B25B 13/56 81/177.75 |
| 4,722,252 A | * | 2/1988 | Fulcher | B25B 13/107 81/57.39 |

(Continued)

*Primary Examiner* — Hadi Shakeri
(74) *Attorney, Agent, or Firm* — Justin B. Bender, Esq.

(57) ABSTRACT

According to a first aspect of the invention we provide a self-retaining drive shaft assembly for use with a device for tightening and loosening of an industrial fastener having: a drive retainer drive shaft; a drive retainer cap; a drive retainer plunger; and a drive retainer segment assembly. The segment assembly is formed between the drive shaft and the cap. The cap is formed between the segment assembly and the plunger. The segment assembly, the cap and the plunger are formed substantially within the drive shaft. Advantageously the retainer assembly is of unitary construction; requires no loose parts or external implements to engage and secure the drive shaft to a drive head of the device; reduces likelihood of device failure during operation due to improper engagement of the drive shaft; and increases user safety during device operation.

10 Claims, 9 Drawing Sheets

Fig. 1D (51) Int. Cl.
*B25B 21/00* (2006.01)
*F16C 3/02* (2006.01)
*F16D 1/10* (2006.01)

(52) U.S. Cl.
CPC .......... *B25B 23/0035* (2013.01); *F16C 3/023* (2013.01); *F16D 1/10* (2013.01)

(58) Field of Classification Search
CPC ..... B25B 21/005; B25B 21/004; B25B 23/00; B25B 23/0035; B25B 13/463; F16C 3/023
USPC ....... 81/57.44, 57.39, 442; 403/359.3, 359.1, 403/359.2, 359.5, 315, 297
See application file for complete search history.

(56) References Cited

U.S. PATENT DOCUMENTS

| | | | | |
|---|---|---|---|---|
| 4,762,033 | A * | 8/1988 | Chow | B25B 13/465 81/177.85 |
| 5,732,989 | A * | 3/1998 | Stevenson | E05B 67/36 292/318 |
| 6,761,094 | B2 * | 7/2004 | Tobako | B25G 1/043 403/328 |
| 7,062,993 | B2 * | 6/2006 | Shaw | B25B 21/005 81/54 |
| 8,251,418 | B2 * | 8/2012 | Van Os | B25B 27/06 294/95 |
| 8,342,787 | B2 * | 1/2013 | Smith | F16B 35/041 411/354 |
| 2006/0053981 | A1 * | 3/2006 | Shaw | B25B 21/005 81/57.39 |

* cited by examiner

APPARATUS FOR TIGHTENING THREADED FASTENERS

CROSS REFERENCE TO RELATED APPLICATIONS

This Application claims priority to U.S. Application Ser. No. 61/862,530, having Filing Date of 6 Aug. 2013, entitled "APPARATUS FOR TIGHTENING THREADED FASTENERS", an entire copy of which is incorporated herein by reference.

BACKGROUND

Retainers for drive shafts in torque wrenches are well known and often include bushings or bearings using conventional spring clips, snap rings and/or separate cap assemblies. Often special tools are needed to install or remove these prior art solutions. Absent due care, components of prior art solutions are lost or damaged during tightening and/or loosening operations. Prior art solutions may include an attached chain or lanyard between the spring clip, snap ring and/or cap assembly and the drive shaft to reduce component loss and/or damage and increase safety. The chain or lanyard, however, is undesirably loose and dangles off of the tool. Operators often operate torque wrenches with improperly retained drive shafts. Components of prior art solutions not properly seated often come off creating dangerous and unsafe operating conditions.

DESCRIPTION OF INVENTION

A self-retaining drive shaft assembly of unitary construction is invented and disclosed and includes: a drive retainer drive shaft; a drive retainer cap; a drive retainer plunger; and a drive retainer segment assembly. Advantageously retainer assembly is of unitary construction; requires no loose parts or external implements to engage and secure the drive shaft to the drive head of the tool; reduces likelihood of tool failure during operation due to improper engagement of the drive shaft; and increases user safety during tool operation.

The invention may be described, by way of example only, with reference to the accompanying drawings, of which.

Referring to FIGS. 1A-1F, self-retaining drive shaft assembly 100 of unitary construction having an axis A is shown and includes: a drive retainer drive shaft 101; a drive retainer cap 102; a drive retainer plunger 103; and a drive retainer segment assembly 104. Segment assembly 104 is formed between drive shaft 101 and cap 102. Cap 102 is formed between segment assembly 104 and plunger 103. Segment assembly 104, cap 102 and plunger 103 are formed adjacent and substantially within drive shaft 101. A reaction force assembly 120 is also shown and includes: a spline sleeve bushing 121; a reaction arm bushing 122; and a set screw 123. FIGS. 1A-1F show assembly 100 fully engaged.

Figures 1A, 1B, 1C, 1D:
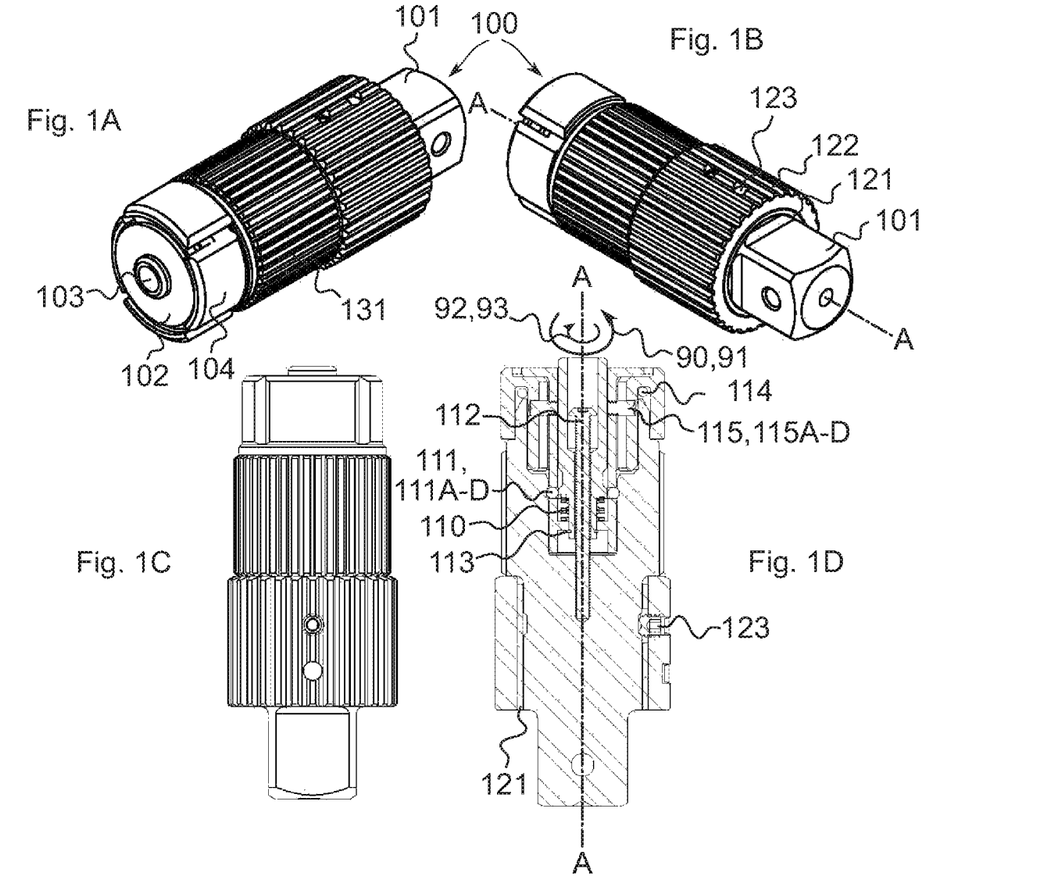
FIG. 1A is a first isometric perspective view of a fully engaged and locked self-retaining drive shaft assembly of the present invention.
FIG. 1B is a second isometric perspective view of the assembly of FIG. 1.
FIG. 1C is a side view of the assembly of FIG. 1.
FIG. 1D is a cross-section view showing internal parts of the assembly of FIG. 1.
Figure 1E:
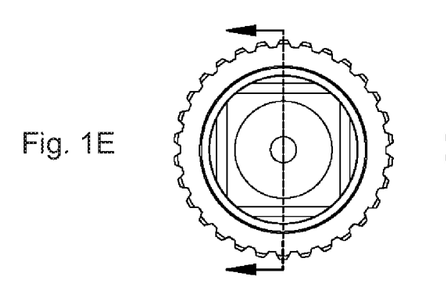
FIG. 1E is a top view of the assembly of FIG. 1.
Figure 1F:
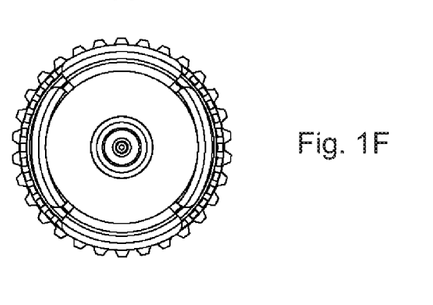
FIG. 1F is a bottom view of the assembly of FIG. 1.
Figure 2:
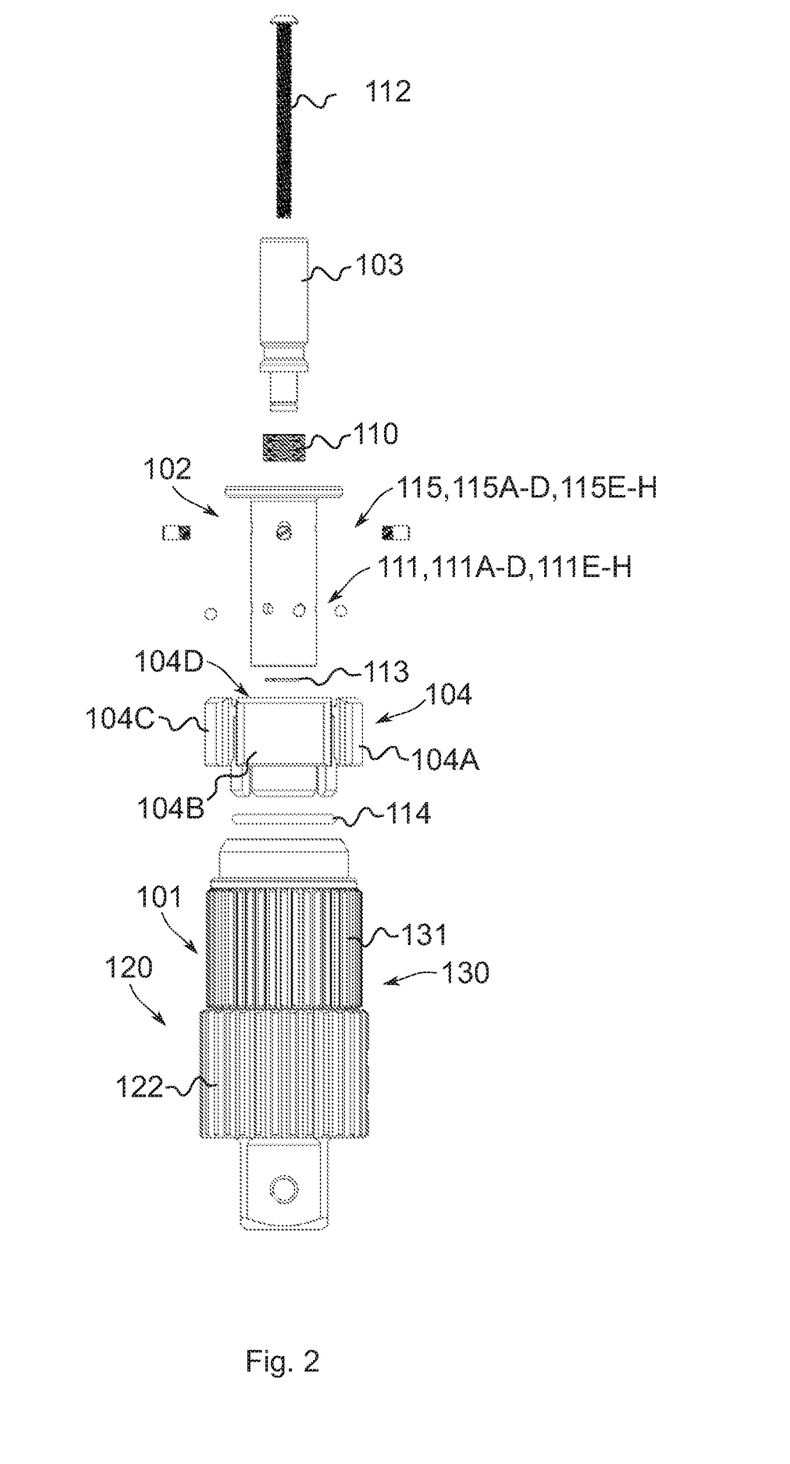
FIG. 2 is an exploded side view of the assembly of FIG. 1.
Figure 3A:
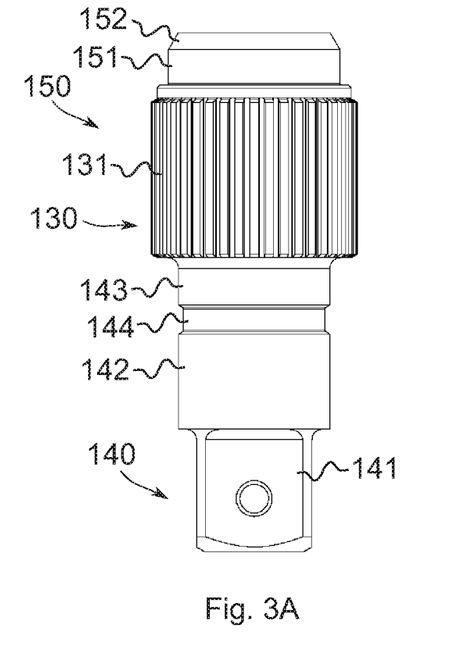
FIGS. 3A-3D show various views of a drive shaft of the assembly of FIG. 1.
Figure 3B:
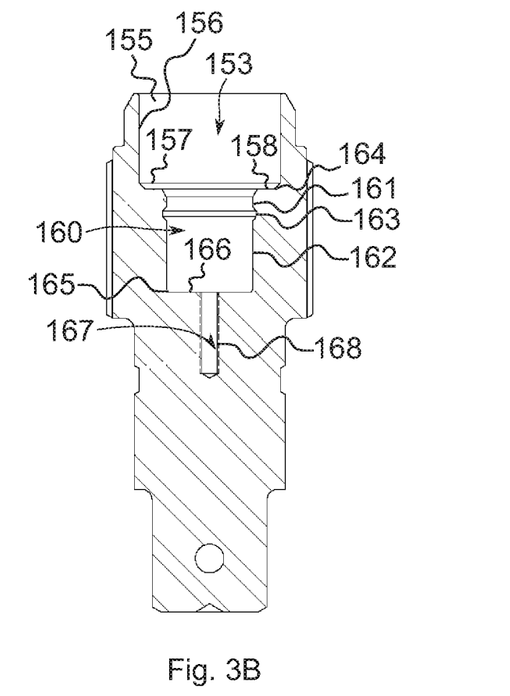
Figure 3C:
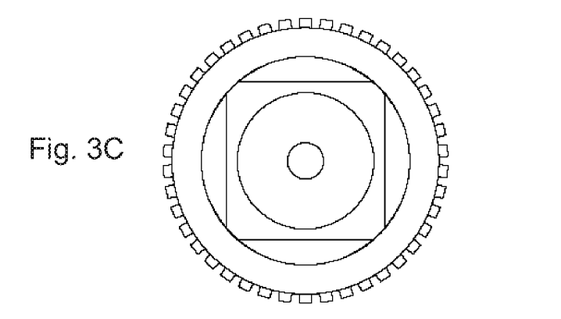
Figure 3D:
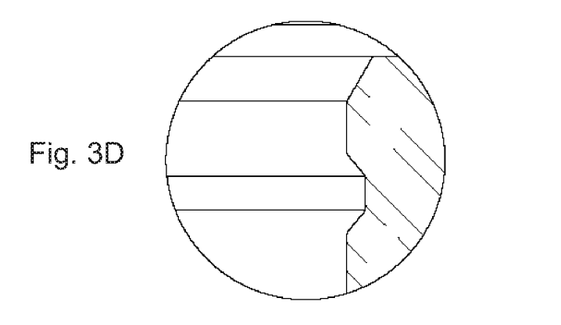
Figure 4A:
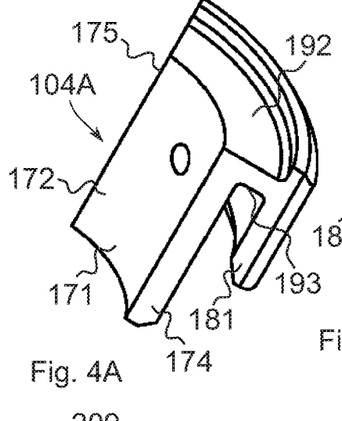
FIGS. 4A-4D show various views of a segment of a segment assembly of the assembly of FIG. 1.
Figure 4B:
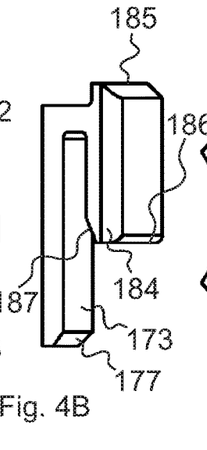
Figure 4C:
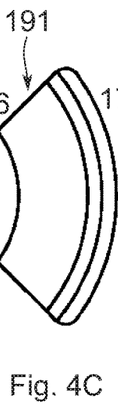
Figure 4D:
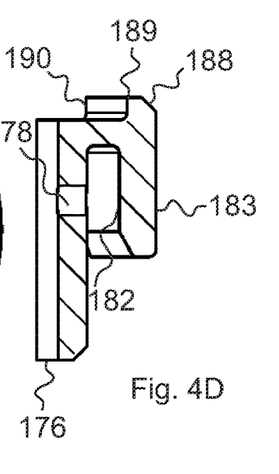

FIG. 2 shows an exploded view of most component parts of assembly 100. Assembly 100 also includes segments 104A-D of retainer assembly 104; a wave spring 110; a ball bearing assembly 111 with ball bearing holes 111A-D and ball bearings 111E-H; a mounting screw 112; a retaining ring 113; a retaining o-ring 114; and a segment pin assembly 115 with segment holes 115A-D and segment pins 115E-H. Retaining o-ring 114 is formed between drive shaft 101 and segment assembly 104. Segment assembly 104 is formed between retaining o-ring 114 and cap 102. Cap 102 is formed between segment assembly and wave spring 110. Wave spring 110 is formed between cap 102 and plunger 103. Plunger 103 is formed between wave spring 110 and mounting screw 112. And mounting screw 112 holds in place and prevents the component parts of drive shaft assembly 100 from coming apart.

Referring to FIG. 3, four views (3A-3D) are shown of drive shaft 101. Drive shaft 101 is cylindrical in shape having a drive end 140 and a free end 150. Drive end 140 includes: a drive adaptor 141; bearing surfaces 142 and 143; and a recess 144 formed between bearing surfaces 142 and 143. Drive adaptor 141 interfaces with a drive socket of a torque tool having a fastener, such as a nut or a bolt to be driven (not shown). As shown, drive adaptor 141 is a square drive, although it is to be understood that it could be any other type of drive such as a cap screw drive, a socket drive or an alien key drive, etc. Bearing surfaces 142 and 143 rotatably connect reaction force assembly 120 to drive shaft 101 by accepting spline sleeve bushing 121. Spline sleeve bushing 121 accepts reaction arm bushing 122 which are held in place by set screw 123 protruding into in recess 144. Reaction force assembly 120 freely rotates relative to drive shaft 101.

Free end 150 includes a drive force assembly 130 including an external spline 131 and a bearing surface 151 with a chamfered edge 152 adjacent to a recess 153. Recess 153 includes a first bore 155 having a radius larger than a second bore 160 having a larger radius than a third bore 167. First bore 155 includes a wall 156 which runs parallel to axis A and is separated from an internal face 158 by a chamfered edge 157. Second bore 160 includes an upper wall 161 and a lower wall 162 which run parallel to axis A and wall 156 and are separated by a recess 163. Upper wall 161 is separated from internal face 158 of first bore 155 by a chamfered edge 164. Lower wall 162 is separated from an internal face 166 by a chamfered edge 165. Third bore 167 may extend into drive end 140 and includes internal threads 168 to receive an end of mounting screw 112.

Referring to FIG. 4, four views (4A-4D) are shown of one segment 104A of segment assembly 104. Segment assembly 104 includes four segments 104A-D, each of equal size and dimension with arc lengths of approximately 90°. Segment 104A is generally shaped as one quarter (¼) of a cylindrical solid and includes: a first cylindrical solid portion segment 171; a second ¼ cylindrical solid portion segment 181; a hollow solid disc portion segment 191 which connects first and second segments 171 and 181. First ¼ cylindrical solid portion segment 171 includes: an inner wall 172; an outer wall 173; a first side wall 174; a second side wall 175; a bottom wall 176; a chamfered edge 177; and a drive retainer assembly segment pin bore 178 for segment pin 115A. Second ¼ cylindrical solid portion segment 181 includes: a first inner wall 182; an outer wall 183; a first side wall 184; a second side wall 185; a bottom wall 186; a first chamfered edge 187; a second chamfered edge 188; a top wall 189; and a second inner wall 190. ¼ hollow disc solid portion segment 191 includes: a top wall 192; and a bottom wall 193.

Figure 5A:
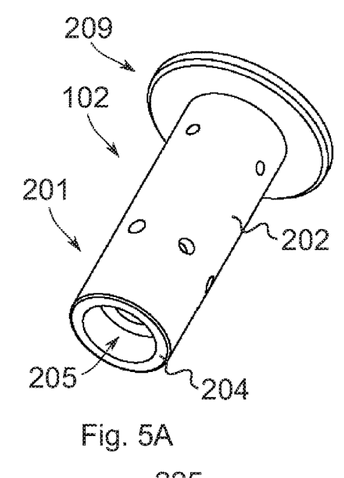
FIGS. 5A-5C show various views of a cap of the assembly of FIG. 1.
Figures 5B, 5C:
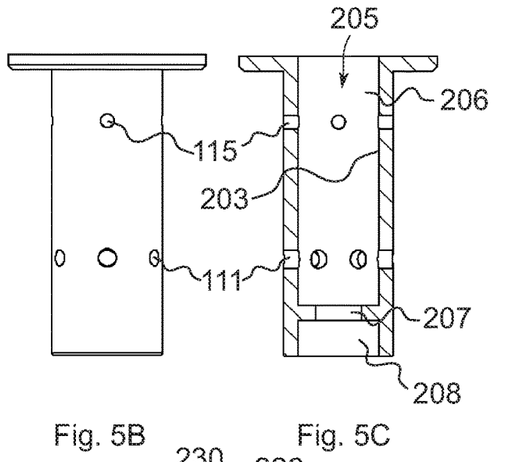

Referring to FIG. 5, three views (5A-5C) are shown of drive retainer cap 102. Cap 102 is cylindrical in shape having a lower hollow cylindrical solid portion 201 and an upper hollow solid disc 209. Lower hollow cylindrical solid portion 201 includes: an outer wall 202; an inner wall 203; a bottom wall 204; a recess 205 having an upper bore 206 and a lower bore 208 of similar radius separated by a middle bore 207 of lesser radius; ball bearing assembly 111 with ball bearing holes 111A-D and ball bearings 111E-H; and segment pin assembly 115 with segment holes 115A-D and segment pins 115E-H.

Figures 6A, 6B, 6C:
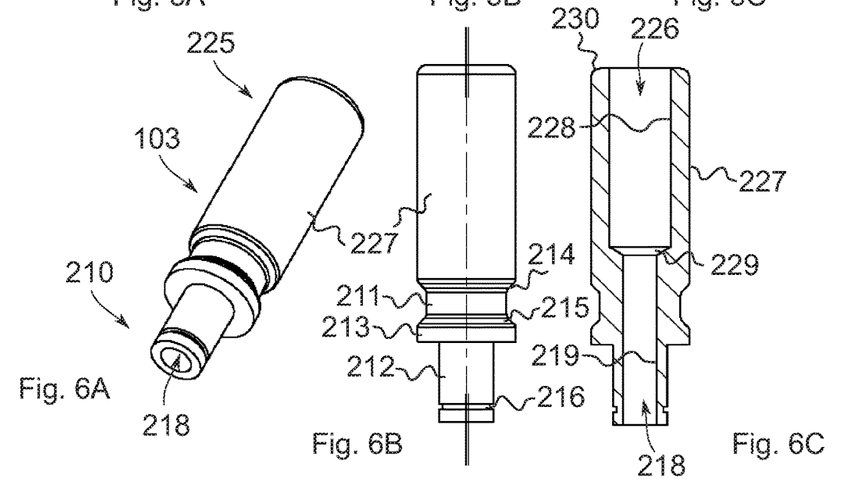
FIGS. 6A-6C show various views of a plunger of the assembly of FIG. 1.

FIG. 6 shows three views (6A-6C) of drive retainer plunger 103. Plunger 103 is cylindrical in shape having a connection end 210 and a depression end 225. Connection end 210 includes: an upper hollow recessed cylindrical solid 211; a lower hollow cylindrical solid 212; and a hollow solid disc 213. Upper solid 211 is separated from depression end 225 by a chamfered edge 214 above and a chamfered edge 215 below. Lower solid 212 extends below disc 213 and includes an outer o-ring edging 216 and a recess 218 having an inner wall 219. Depression end 225 includes a recess 226; an outer wall 227; an inner wall 228; an inner chamfered edge 229; and an upper wall 230. Recess 226 has a radius larger than recess 218.

Figures 7A, 7B, 7C:
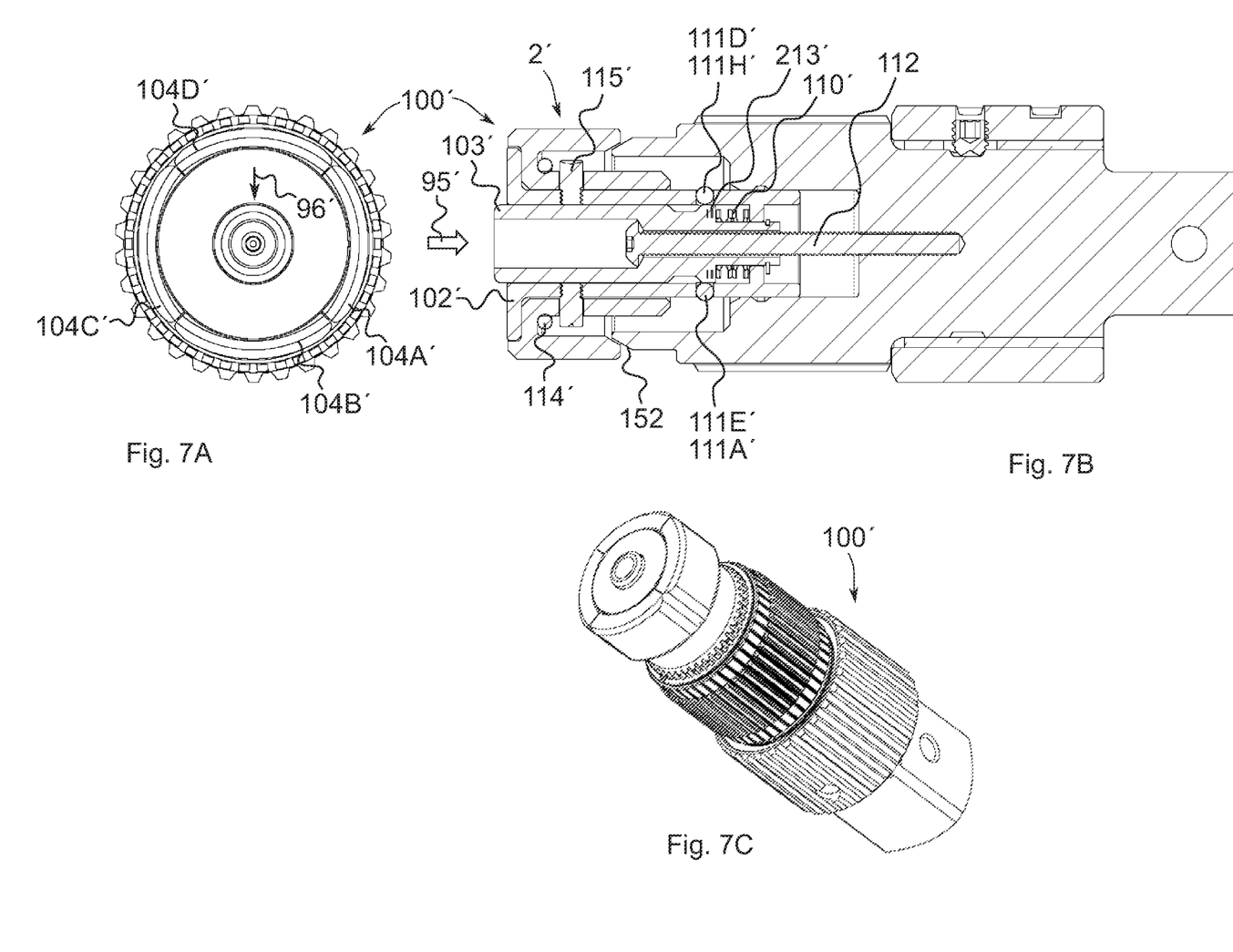
FIGS. 7A-7C show various views of a disengaged and unlocked self-retaining drive shaft assembly of the present invention.

As shown in FIGS. 7A-7C, component parts of assembly 100' are attached but assembly 100' is in a disengaged and unlocked position 2'. Segment pin assembly 115' attaches segments 104A'-D' to cap 102'. Wave spring 110' separates cap 102' from plunger 103'. Retaining O-ring 114' is placed adjacent bottom wall 193. Assembly 100' is ready to be installed in a tool 1, as shown in FIGS. 10A-10F. Mounting screw 112 holds in place and prevents component parts from coming out of assembly 100'.

During engagement, a user depresses plunger 103' with a pushing force 95'. Generally cap 102', plunger 103' and segment assembly 104' move downward into and around drive shaft 101. Wave spring 110' starts to compress. Ball bearings 111E'-H' begin to retract into ball bearing holes 111A'-D' of ball bearing assembly 111' as disc 213' moves downward. O-ring 114' begins to expand thereby increasing an inward compression force 96' against segments 104A'-D'. Nonetheless segments 104A'-D' ride along chamfered edge 152 and expand outward to fill recess 153.

Figure 8A:
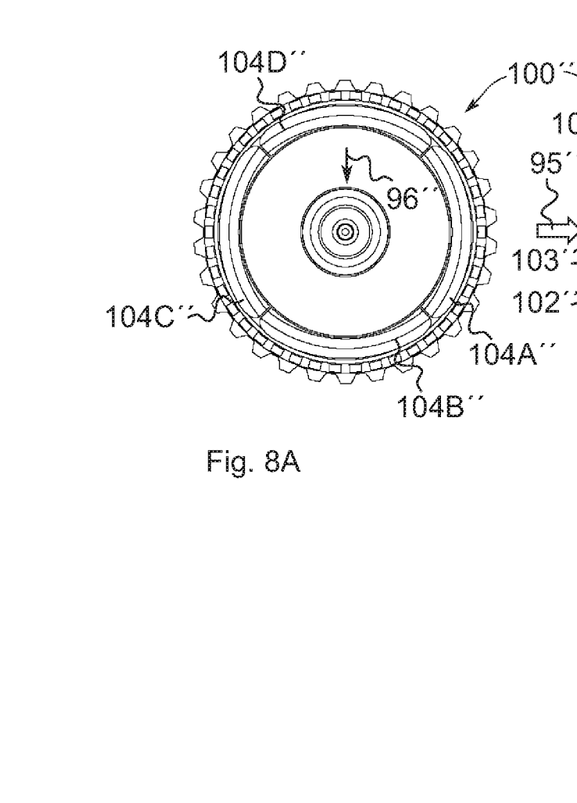
FIGS. 8A-8B show various views of a partially engaged and unlocked drive shaft assembly of the present invention.
Figure 8B:
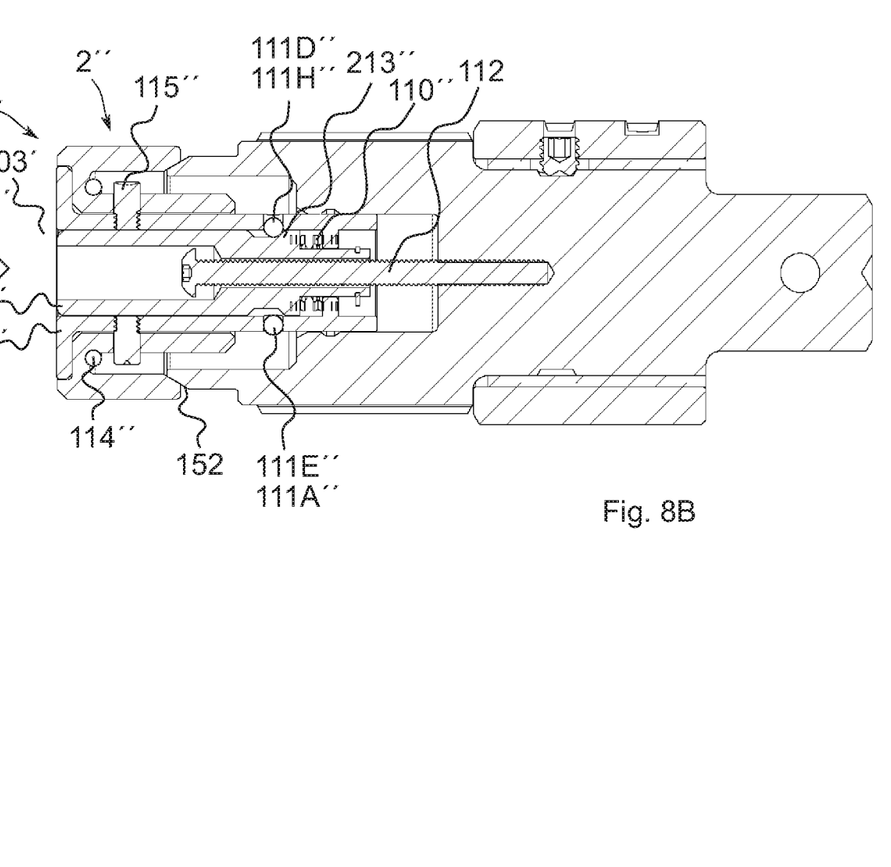

As shown in FIGS. 8A and 8B, component parts of assembly 100" are attached but assembly 100' is in a partially engaged and unlocked position 2". The user further depresses plunger 103" with pushing force 95". Cap 102, plunger 103" and segment assembly 104" move downward into and around drive shaft 101. Wave spring 110" further compresses. Ball bearings 111E"-H" further retract into ball bearing holes 111A"-D" of ball bearing assembly 111" as disc 213" moves further downward. O-ring 114" further expands thereby increasing inward compression force 96" against segments 104A"-D". Nonetheless segments 104A"-D" ride further along chamfered edge 152 and expand further outward toward an engaged and locked position.

Figure 9A:
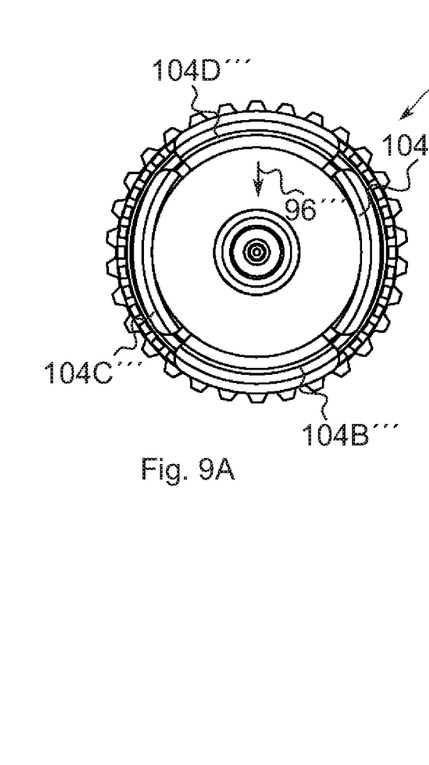
FIGS. 9A-9C show various views of the assembly of FIG. 1.
Figures 9B, 9C:
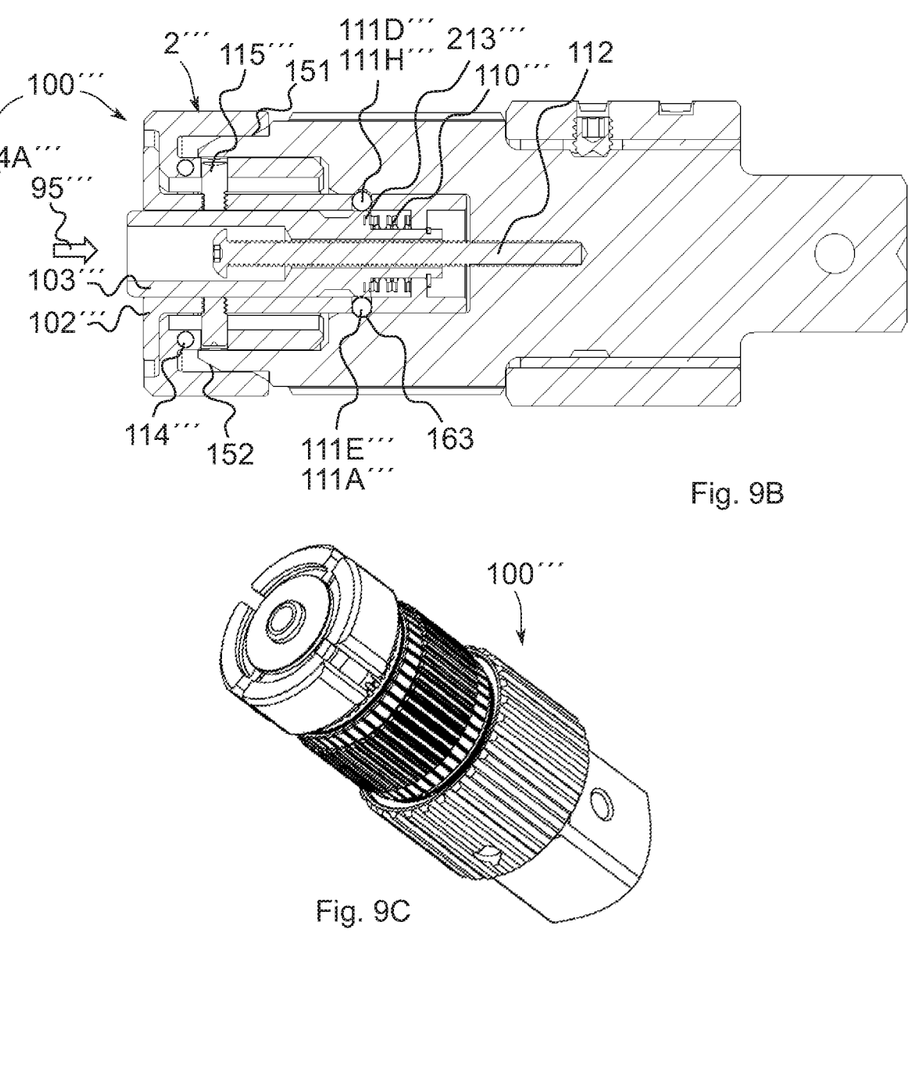
Figure 10A:
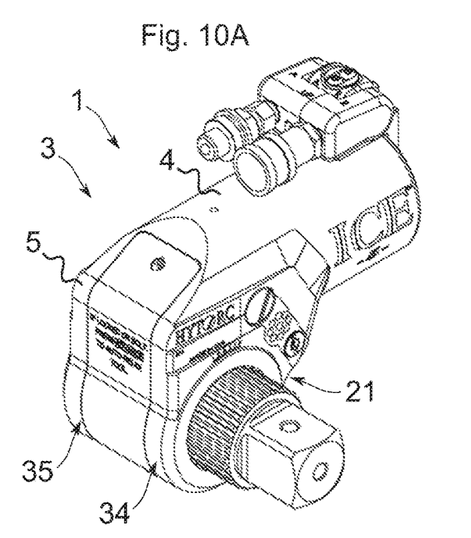
FIGS. 10A-10F show various views of a device for tightening or loosening threaded fasteners having the assembly of FIG. 1.
Figure 10B:
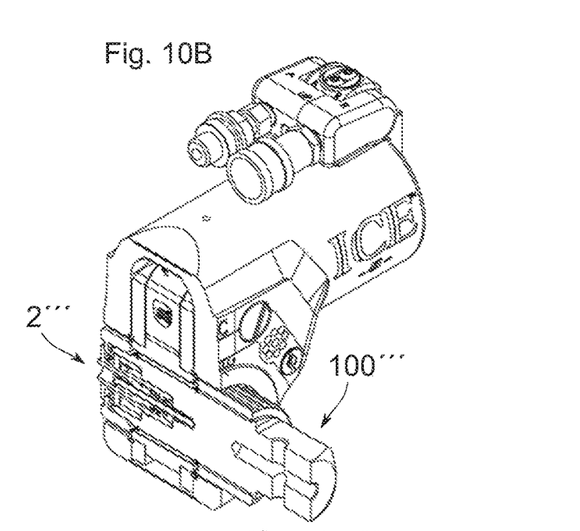
Figure 10C:
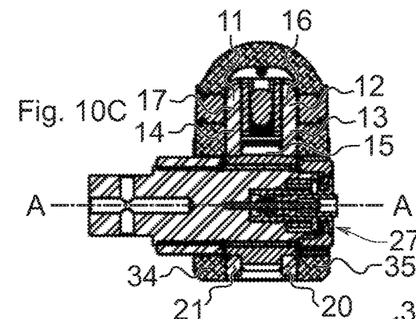
Figure 10D:
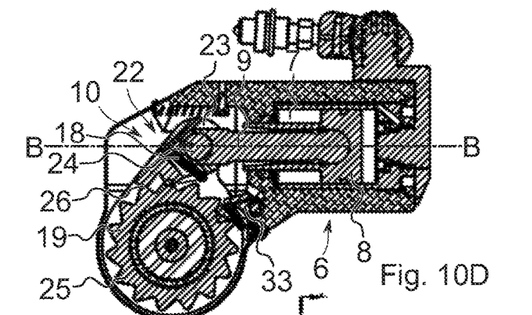
Figure 10E:
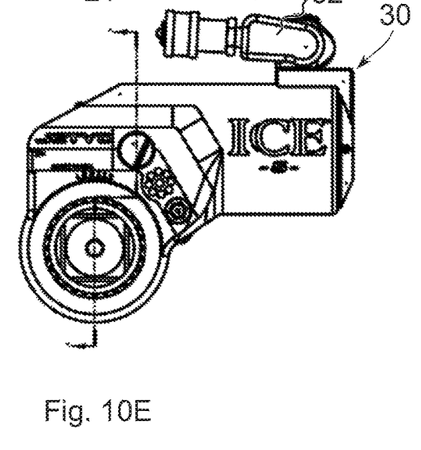
Figure 10F:
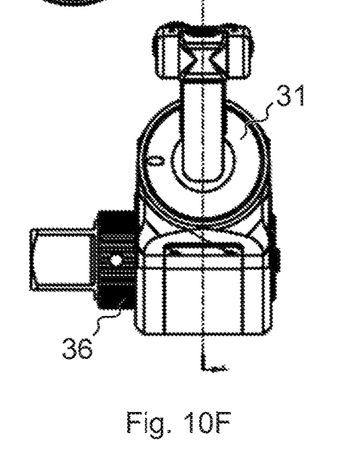

As shown in FIGS. 9A-9C, retainer assembly 100" and component parts are in a fully engaged and locked position 2". The user fully depresses plunger 103" with pushing force 95". Cap 102', plunger 103" and segment assembly 104" are within and around drive shaft 101. Once the user removes pushing force 95", wave spring 110" decompresses which forces plunger 103" upward. Ball bearings 111E"-H" retract into recess 163 of drive shaft 101 as disc 213" moves upward with plunger 103"'. O-ring 114" fully expands thereby increasing inward compression force 96" against segments 104A"-D". Segments 104A"-D" substantially surround bearing surface 151 and expand to substantially fill recess 153. Indeed outer wall 173 and of segments 104A'"-104D'" are adjacent wall 156 of first bore 153. Note that FIGS. 1A-1F are similar to FIGS. 9A-9C.

FIGS. 10A-10F show torque tool 1 having retainer assembly 100'" and its component parts in a fully engaged and locked position 2'". Torque tool 1 includes a housing 3 having two housing portions, a cylinder portion 4 and a driving portion 5. A cylinder-piston assembly 6 is arranged in cylinder housing portion 4 and includes: a cylinder 7; a piston 8 reciprocatingly movable in cylinder 7 along a piston axis B; and a piston rod 9 connected with piston 8.

A lever-type ratchet assembly 10 is arranged in driving housing portion 5 and connected to and drivable by cylinder-piston assembly 6. Ratchet assembly 10 includes a pair of drive plates 11 and 12 mounted side-by-side and having upper portions 13 and 14 forming a rod pin slot 15 therebetween and having aligned rod pin bores 16 and 17 for receiving a rod pin 18 mounted therein. Drive plates 11 and 12 are supported for partial rotation within driving portion 5 around a ratchet wheel 19. Lower portions 20 and 21 of drive plates 11 and 12 are shaped similarly as part of driving portion 5. Upper portions 13 and 14 of driving plates 11 and 12 define a generally triangular, downward opening area containing a similarly shaped drive pawl assembly 22.

Drive pawl assembly 22 includes a drive pawl 23 that is mounted therein with limited vertical travel within an indention dictated by a drive pawl spring 24. Drive pawl spring 24 bears against the upper portion of drive pawl 23 for maintaining ratcheting spring pressure against drive pawl 23 and forcing drive pawl 23 against ratchet wheel 19. Ratchet wheel 19 has peripheral driven teeth 25 which mesh with driving teeth 26 on the underside of drive pawl 23. Drive pawl 23 is driven forward by drive plates 11 and 12 which is driven by piston rod 9. Likewise ratchet wheel driven teeth 25 are driven in forward rotation. When piston rod 9 is retracted, drive pawl spring 24 is extended by drive pawl 23 when driving teeth 26 ratchet back over ratchet wheel driven teeth 25 to the withdrawn position. These actions affects retainer assembly 100'", generally, and drive shaft 101, specifically, to rotate relative to housing 3 around a drive axis A.

Tool 1 also includes: a rear swivel assembly 30; an end cap cover 31; a swivel block assembly 32; an automatic reaction pawl assembly 33; a reaction force transfer assembly 36 having a first and a second housing connection means 34 and 35; and various plates, set screws, seals, retaining rings; o-rings, pins, and plugs.

Tool 1 may be driven by any suitable means, such as hydraulically, pneumatically, electrically or manually driven. Alternatively any suitable torque wrench mechanism with any suitable configuration and/or component could be employed to practice the invention.

The user sends drive end 140 of disengaged retainer assembly 100' through ratchet 19 to engage with the drive train of torque wrench 1. Assembly 100' may be inserted into a drive bore 27 of tool 1 from either side and driven either in one rotary direction 91 to tighten a bolt with a turning force 90 or another rotary direction 93 to loosen a bolt with a turning force 92. Note that in either orientation, drive force assembly 130 nonrotatably connects assembly 100 to ratchet assembly 10. Ratchet assembly 10 is internally splined to mate in driving engagement with external spline 131. Reaction force assembly 120 nonrotatably connects assembly 100 to reaction force transfer assembly 36 integrated with driving housing portion 5 via a splined connection.

Figures 11A, 11B:
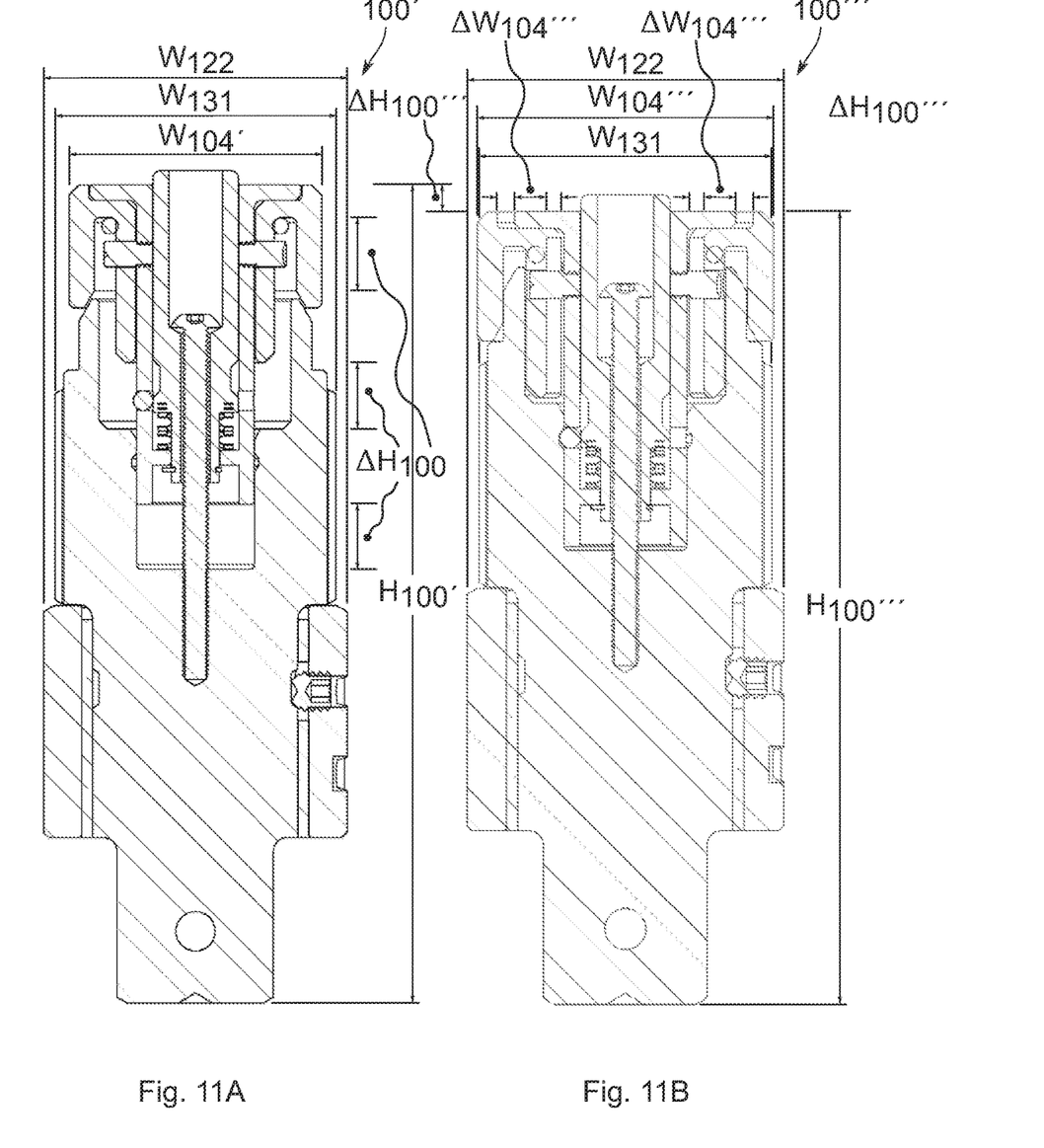
FIG. 11A is a cross-section view showing various dimensions of the assembly of FIGS. 7A-7C.
FIG. 11B is a cross-section view showing various dimensions of the assembly of FIG. 1.

FIG. 11A shows dimensions of retainer assembly 100' in disengaged position 2' while FIG. 11 shows dimensions of retainer assembly 100''' in fully engaged and locked position 2''. Retainer assembly 100' has a height $H_{100'}$ and widths $W_{104'}$, $W_{131}$ and $W_{122}$, corresponding to the widths of segment assembly 104', external driving spline 131 and reaction arm bushing 122, respectively. Minimal gap exists between segments 104A'-104D'.

Retainer assembly 100'' has a height $H_{100'''}$; $\Delta H_{100'''}$ corresponds to the decrease in height of retainer assembly 100''' in engaged and locked position 2''. Widths $W_{104'''}$, $W_{131}$ and $W_{122}$, correspond to the widths of segment assembly 104''', external driving spline 131 and reaction arm bushing 122, respectively. A gap exists between segments 104A'''-104D''', such that $2*\Delta W_{104'''}+W_{104'}=W_{104'''}$. Indeed $W_{104'''}$ is greater than $W_{131}$ which locks retainer assembly 100'' into place and prevents it from falling out of tool 1. $\Delta W_{104'''}$ also corresponds to the distances segments 104A'''-104D''' expand within and to fill recess 153. In other words, segment assembly 104''' has a circular outer periphery which is greater than the diameter of external spline 131.

Note that retainer assembly 100 may be made in any suitable size(s) and from any suitable material(s).

Advantageously retainer assembly 100 is of unitary construction; requires no loose parts or external implements to engage and secure the drive shaft to the drive head of the tool; reduces likelihood of tool failure during operation due to improper engagement of the drive shaft; and increases user safety during tool operation.

It will be understood that each of the elements described above, or two or more together, may also find a useful application in other types of constructions differing from the types described above. The features disclosed in the foregoing description, or the following claims, or the accompanying drawings, expressed in their specific forms or in terms of a means for performing the disclosed function, or a method or process for attaining the disclosed result, as appropriate, may, separately, or in any combination of such features, be utilized for realizing the invention in diverse forms thereof.

While the invention has been illustrated and described as embodied for use with a fluid operated tool, it is not intended to be limited to the details shown. Various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

When used in this specification and claims, the terms "comprising", "including", "having" and variations thereof mean that the specified features, steps or integers are included. The terms are not to be interpreted to exclude the presence of other features, steps or components.

What is claimed is:

1. A self-retaining drive shaft assembly of unitary construction for use with a device for tightening and loosening of a threaded fastener, the drive shaft assembly including:
   a drive shaft;
   a retaining o-ring formed between the drive shaft and a segment assembly;
   the segment assembly, formed between the retaining o-ring and a cap, having a number of segments attached to the cap by a segment pin assembly with segment pin holes and segment pins;
   the cap, formed between the segment assembly and a wave spring, having a ball bearing assembly with ball bearing holes and ball bearings;
   the wave spring formed between the cap and a plunger;
   the plunger formed between the wave spring and a mounting screw; and
   the mounting screw to hold the drive shaft assembly together.

2. The self-retaining drive shaft assembly of unitary construction according to claim 1 wherein the segment assembly is substantially formed between the drive shaft and the cap, and wherein the cap is formed between the segment assembly and the plunger.

3. The self-retaining drive shaft assembly of unitary construction according to claim 1 wherein the segment assembly, cap and plunger are substantially formed within the drive shaft.

4. The self-retaining drive shaft assembly of unitary construction according to claim 1 wherein during operation a user presses the plunger such that the cap, the plunger and the segment assembly move downward and into and around a recess in an upper portion of the drive shaft.

5. The self-retaining drive shaft assembly of unitary construction according to claim 1 wherein the segment assembly expands outward to substantially fill a recess in an upper portion of the drive shaft.

6. The self-retaining drive shaft assembly of unitary construction according to claim 1 wherein the height of a fully engaged and locked drive shaft assembly is less than the height of a disengaged and unlocked drive shaft assembly.

7. The self-retaining drive shaft assembly of unitary construction according to claim 1 wherein the width of the segment assembly of a fully engaged and locked drive shaft assembly is greater than the width of the segment assembly of a disengaged and unlocked drive shaft assembly.

8. The self-retaining drive shaft assembly of unitary construction according to claim 1 including:
   the drive shaft having a drive force assembly and a reaction force assembly;
   wherein the width of the segment assembly is less than the width of the reaction force assembly of a disengaged and unlocked drive shaft assembly; and wherein the width of the segment assembly is greater than the width of the drive shaft assembly of a fully engaged and locked drive shaft assembly which prevents it from falling out of the device.

9. A device either electrically, hydraulically or pneumatically driven for tightening and loosening of a threaded fastener having the self-retaining drive shaft assembly of any one of claims 1-8.

10. A system for fastening objects including a threaded fastener and the device of claim 9.

* * * * *